US012564804B2

(12) United States Patent
Cristache

(10) Patent No.: US 12,564,804 B2
(45) Date of Patent: Mar. 3, 2026

(54) FILTER SYSTEM, POSITIONING MECHANISM, FILTER ELEMENT AND METHOD FOR INSERTING AND POSITIONING A FILTER ELEMENT

(71) Applicant: Mahle International GmbH, Stuttgart (DE)

(72) Inventor: Cristian Cristache, Pitesti (RO)

(73) Assignee: Mahle International GmbH (DE)

( * ) Notice: Subject to any disclaimer, the term of this patent is extended or adjusted under 35 U.S.C. 154(b) by 908 days.

(21) Appl. No.: 17/839,415

(22) Filed: Jun. 13, 2022

(65) Prior Publication Data

US 2022/0401861 A1    Dec. 22, 2022

(30) Foreign Application Priority Data

Jun. 18, 2021    (DE) ..................... 10 2021 003 162.8

(51) Int. Cl.
B01D 35/30        (2006.01)
B01D 29/11        (2006.01)
B01D 36/00        (2006.01)

(52) U.S. Cl.
CPC ............ B01D 35/308 (2013.01); B01D 29/11 (2013.01); B01D 36/001 (2013.01); *B01D 2201/04* (2013.01); *B01D 2201/295* (2013.01); *B01D 2201/4053* (2013.01); *B01D 2201/4076* (2013.01)

(58) Field of Classification Search
CPC .... B01D 35/308; B01D 29/11; B01D 36/001;

B01D 2201/04; B01D 2201/295; B01D 2201/4053; B01D 2201/4076; B01D 29/21; B01D 35/153; B01D 35/16; B01D 2201/291; B01D 2201/301; F02M 37/42
See application file for complete search history.

(56) References Cited

U.S. PATENT DOCUMENTS 9,205,355 B2    12/2015  Deschamps
2017/0203242 A1*  7/2017  Weindorf .............. B01D 29/21
2018/0257011 A1    9/2018  Bodén

FOREIGN PATENT DOCUMENTS

EP          2490786 A1    8/2012
WO      2018108802 A1    6/2018

* cited by examiner

*Primary Examiner* — Thuan D Dang
(74) *Attorney, Agent, or Firm* — Fishman Stewart PLLC

(57)        ABSTRACT

A filter system may include a housing, a filter element, and a separate positioning mechanism. The housing may include an opening, a function carrier, a drain opening, and a radially protruding contour. The filter element may include a first end disc, a second end disk, and a filter material disposed between the first end disk and the second end disk. The first end disk may include at least one of a radially projecting contour and an inwardly projecting recess. The second end disk may include a central opening and an eccentrically projecting locking pin. The central opening may be adapted to interact with the function carrier. The positioning mechanism may have a body with a first recess and at least one second recess, which may be configured to facilitate positioning and aligning the filter element in the housing such that the locking pin engages in the drain opening.

20 Claims, 1 Drawing Sheet

FILTER SYSTEM, POSITIONING MECHANISM, FILTER ELEMENT AND METHOD FOR INSERTING AND POSITIONING A FILTER ELEMENT

CROSS-REFERENCE TO RELATED APPLICATIONS

This application claims priority to German Patent Application No. DE 10 2021 003 162.8, filed on Jun. 18, 2021, the contents of which is hereby incorporated by reference in its entirety.

TECHNICAL FIELD

The present invention relates to a filter system, as well as a positioning means and a filter element. The present invention further relates to a method for inserting and positioning a filter element.

BACKGROUND

EP 2 490 786 B1 discloses a filter device with a filter housing pot in which a tubular dome is inserted. The dome has a guiding contour at the upper end in the form of a ramp and a groove. The filter device further comprises an annular filter element with an axially projecting pin and a guiding element in the form of an inwardly directed guiding pin which, during installation, interacts with the guiding contour in such a way that the pin can be inserted into a channel on the filter housing side.

A disadvantage of such a solution is that the filter system must have a positioning device in the form of a guiding contour in the housing, which interacts with the filter element, making the manufacture of the filter device complicated and costly.

US 2018/0 257 011 A1 discloses a filter element that can be inserted into a filter housing. The filter housing can be closed by means of a filter housing cover. The filter element has a first actuating mechanism arranged at the first end. This first actuating means interacts with a second actuating mechanism arranged on the filter housing cover. This interaction of the actuating mechanism results in the conversion of the rotary movement of the filter housing cover into a linear movement of the filter element. Additionally, the filter element comprises a locking mechanism or blocking element at the second end that controls the opening or closing of an opening in the bottom portion of the filter housing. A first guiding rail is arranged between the two ends of the filter element. This first guiding rail cooperates with a second guiding rail arranged on the filter housing when the filter element is inserted into the filter housing.

Furthermore, WO 2018/108 802 A1 discloses a positioning device with a positioning guide element for positioning a first component relative to a second component to be connected thereto in the circumferential direction thereof. When the two components are joined, the positioning guide element interacts with a positioning guiding rail on the second component to provide positioning.

SUMMARY

The present invention therefore deals with the problem of providing an improved or at least an alternative embodiment for a filter system of the generic type, in particular a simplified design of a filter element which is positioned in a filter housing by a separate positioning means.

According to the invention, this problem is solved by the subject matter of independent claim(s). Advantageous embodiments are the subject matter of the dependent claim(s).

The present invention is based on the general idea of providing a filter system with a housing and a filter element, wherein the filter element is positioned in the housing by means of a separate positioning means in such a way that an eccentric locking pin of the filter element, when the element is inserted, closes the decentralized drain opening to allow pressure to build up in the filter chamber of the filter housing. The filter system according to the invention has a housing with an opening for this purpose. In a preferred embodiment, the housing is made of metal, particularly aluminum. The housing remotely comprises an inserted centrally aligned function carrier and a decentralized drain opening in the bottom area of the filter chamber. In addition, in a preferred embodiment, the housing can have a centrally arranged vent line in the function carrier, which is designed to interact with an inserted filter element in such a way that the vent line passes through the filter element and the opening bore of the vent line is located in the filter tube space of the filter chamber of the filter system.

The filter system also comprises a filter element. The filter element comprises a first end disk with a central opening and a radially outwardly projecting contour, which in a preferred embodiment is designed as a rib. In an alternative embodiment, the radially outwardly projecting contour consists of several ribs, with which additional coding to the positioning means can be realized. The filter element further comprises a second end disk and a filter material provided between the first and second end disks. The second end disk has an axially eccentrically protruding locking pin which interacts with the decentralized drain opening in the bottom area of the filter chamber in such a way that when the filter element is properly positioned, the locking pin closes the drain opening. In a preferred embodiment, the filter element also has a centrally arranged support body that is positioned in the filter element such as to protect the filter material from collapsing, in particular from destruction in the event of pressure pulsations. For this purpose, the support body preferably lies directly against the filter material.

A separate positioning means is provided to position the filter element in the housing of the filter system. The positioning element comprises a cylindrical body with at least one opening. It has a first opening that is configured to engage around the outer surface of the housing of the filter system and can be slid over the housing. The body of the positioning element has an outer circumferential wall and a stop collar configured in such a way that the collar rests against the housing of the filter system when the filter element is positioned. The outer circumferential wall includes a first recess configured to interact with the rib of the first end disk. The recess may additionally comprise at least one guiding bar, in a particularly preferred embodiment and for improved guidance, two guiding bars. In a preferred embodiment, the recess is formed as a groove. Furthermore, in a preferred embodiment, the groove may additionally protrude through the stop collar to allow visual inspection to assure that the filter element is properly coupled to the positioning means.

The positioning means has a second recess on the outer circumferential wall, which is designed to cooperate with at least one protruding contour of the housing. In a preferred embodiment, the second recess is in the form of a groove.

Both recesses of the positioning means are arranged relative to each other in such a way that a filter element to be inserted into the housing of the filter system is positioned in the housing in such a way that the eccentric locking pin of the filter element engages in the drain opening of the filter housing. When properly installed, the filter element separates the filter chamber into a filter clean side and a filter crude side. The filter crude side contains the fluid to be cleaned and is connected to an inlet of the housing in such a way that the fluid to be cleaned can flow via the inlet onto the filter crude side of the filter chamber. The filter clean side is arranged downstream of the filter element in terms of flow and contains the fluid cleaned by the filter element. The filter clean side of the filter chamber is connected to an outlet of the housing in order to convey the fluid from the filter chamber to a consumer.

Other important features and advantages of the invention can be seen from the dependent claims, from the drawings and from the associated description of the figure based on the drawings.

It is understood that the above-mentioned features and those yet to be explained below can be used not only in the combination indicated in each case, but also in other combinations or on their own, without deviating from the scope of the present invention.

Preferred embodiments of the invention are shown in the drawings and will be explained in more detail in the following description, wherein identical reference numbers refer to identical or similar or functionally identical components.

BRIEF DESCRIPTION OF THE DRAWINGS

A schematic representation of the following is shown.

DETAILED DESCRIPTION

Figure 1:
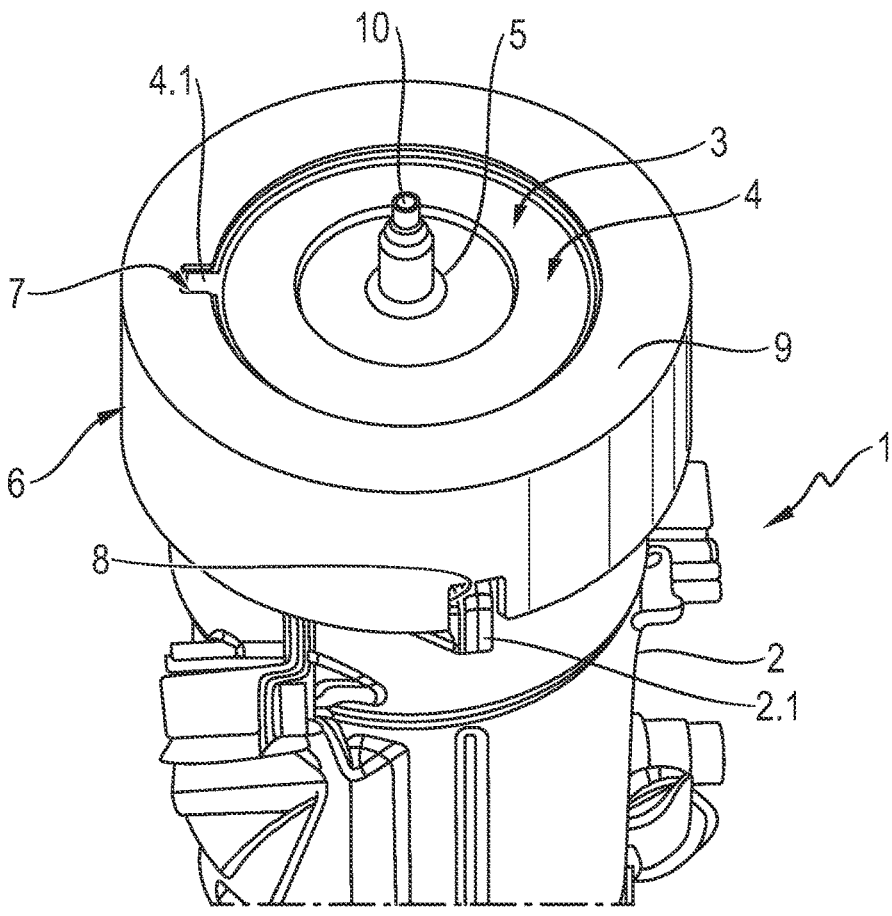
FIG. 1 shows a view of the filter system with the positioning means used.

According to FIG. 1, the filter system 1 according to the invention comprises a housing 2 with an opening. In a preferred embodiment, the housing 2 is made of metal, particularly aluminum. The housing 2 further comprises a decentralized drain opening in the bottom region of the filter chamber. In addition, in a preferred embodiment, the housing 2 may include a vent line 10.

The filter system 1 comprises a filter element 3. The filter element 3 comprises a first end disk 4 with a central opening 5 and a radially outwardly projecting contour 4.1, which in a preferred embodiment is designed as a rib 4.1. The filter element 3 further comprises a second end disk not shown in the figure, and a filter material provided between the first and second end disks 4. The second end disk has an axially eccentrically protruding locking pin which interacts with the decentralized drain opening in the bottom area of the filter chamber in such a way that when the filter element 3 is properly positioned, the locking pin closes the drain opening.

A separate positioning means 6 is provided to position the filter element 3 in the housing 2 of the filter system 1. The positioning means 6 has a cylindrical shape. It has a first opening that is configured to engage around the outer surface of the housing 2 and can be slid over the housing 2. Furthermore, the positioning means 6 has a stop collar 9, which is designed in such a way that the collar 9 rests on the housing 2 of the filter system 1 when the filter element 3 is positioned The positioning means 6 also comprises a first recess 7, in a preferred embodiment the recess 7 is formed as a groove, which interacts with the rib 4.1 projecting radially outward. In addition to the first recess 7, the positioning means 6 comprises a second recess 8. In a preferred embodiment, the second recess 8 is in the form of a groove in such a way that the groove 8 interacts with a radially outwardly projecting contour 2.1, preferably a rib 2.1, of the housing 2. The positioning means 6 is designed in such a way that when a filter element 3 is replaced and/or reinserted, the filter element 3 is positioned in the housing 2 of the filter system 1 with the aid of the positioning means 6, in such a way that the eccentric locking pin of the filter element 3 engages in the decentralized drain opening in the bottom region of the filter chamber of the housing 2 and closes it.

Figure 2:
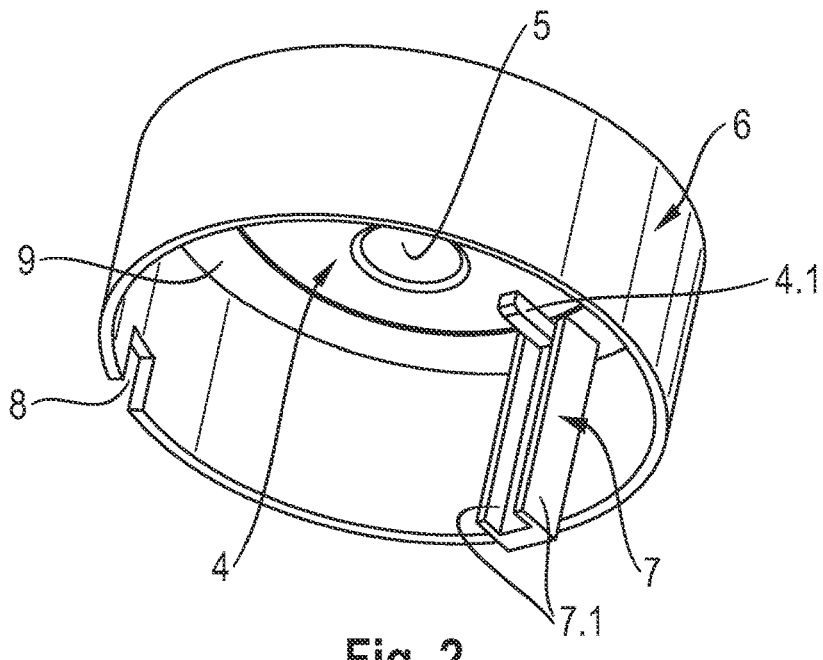
FIG. 2 shows a view of the positioning means according to the invention.

FIG. 2 shows a view of the positioning means 6 according to the invention for positioning the filter element 3 in the housing 2 of the filter system 1.

The positioning element 6 comprises a cylindrical body. The body has an outer circumferential wall and a stop collar 9. The outer circumferential wall includes a first recess 7 configured to interact with the rib 4.1 of the first end disk. The recess 7 may additionally have guiding bars 7.1 at the edges of the recess 7 for better guidance. In a preferred embodiment, the recess 7 is formed as a groove. Furthermore, in a preferred embodiment, the groove 7 can additionally project through the stop collar 9.

The positioning means 6 has a second recess 8 on the outer circumferential wall, which is designed to cooperate with one protruding contour 2.1 of the housing 2. In a preferred embodiment, the second recess 8 is in the form of a groove.

Both recesses 7,8 are arranged relative to each other in such a way that a filter element to be inserted into the housing 2 of the filter system 1 is positioned in the housing 2 in such a way that the eccentric locking pin of the filter element 3 engages in the drain opening of the filter housing 2.

FIG. 2 also shows as an example how the first end disk 4 of the filter element 3 is guided over the rib 4.1 using the groove 7 and the guiding bar 7.1 of the positioning means 6 in the positioning means 6.

The invention claimed is:

1. A filter system, comprising:

a housing including an opening, a function carrier, a drain opening, and at least one contour radially protruding from an outer surface of the housing;

a filter element including a first end disc, a second end disk, and a filter material disposed between the first end disk and the second end disk;

the first end disk including at least one of a radially projecting contour and an inwardly projecting recess;

the second end disk including a central opening and an eccentrically projecting locking pin, the central opening adapted to interact with the function carrier of the housing such that, in an installed position, the filter element separates a filter clean side from a filter crude side;

a separate positioning mechanism having a body with a first recess disposed on an inner circumference and at least one second recess disposed on an outer circumference; and wherein the first recess and the at least one second recess are configured to facilitate positioning and aligning the filter element in the housing such that the locking pin of the filter element engages in the drain opening of the housing.

2. The filter system according to claim 1, wherein the at least one radially protruding contour of the housing is a radially protruding rib.

3. The filter system according to claim 1, wherein the housing is composed of a metal.

4. The filter system according to claim 1, wherein the function carrier is composed of a plastic.

5. The filter system according to claim 1, wherein the body of the positioning mechanism is a cylindrical body.

6. The filter system according to claim 5, wherein the cylindrical body includes a first opening and a second opening, the first opening having a smaller diameter than the second opening.

7. The filter system according to claim 6, wherein the first opening is configured to interact with the first end disk of the filter element and the second opening is configured to interact with the outer surface of the housing.

8. The filter system according to claim 5, wherein the first recess and the at least one second recesses of the positioning mechanism are each configured as a groove.

9. The filter system according to claim 8, wherein the positioning mechanism further includes two guiding bars disposed on the inner circumference at edges of the first recess.

10. A positioning mechanism for the filter system according to claim 1.

11. The positioning mechanism according to claim 10, further comprising a stop collar.

12. A filter element for the filter system according to claim 1.

13. The filter element according to claim 12, further comprising a support body.

14. The filter element according to claim 12, wherein the first end disk further includes an opening configured to cooperate with a housing-fixed vent line.

15. A method for inserting and positioning a filter element in a filter system:

providing the filter element, the filter element including a first end disc, a second end disk, and a filter material disposed between the first end disk and the second end disk, the first end disk including at least one of a radially projecting contour and an inwardly projecting recess, the second end disk including a central opening and an eccentrically projecting locking pin;

providing a separate positioning mechanism having a body with a first recess disposed on an inner circumference and at least one second recess disposed on an outer circumference;

inserting the filter element into a housing of the filter system such that the locking pin of the second end disk interacts with a drain opening of the housing, the housing including an opening, a function carrier, and at least one contour radially protruding from an outer surface of the housing;

coupling the positioning mechanism to the filter element such that the first recess on the inner circumference of the positioning mechanism interacts with the contour of the first end disk;

rotating the coupled unit of the positioning mechanism and the filter element such that the at least one recess on the outer circumference of the positioning mechanism interacts with the at least one contour of the housing such that the locking pin of the second end disk of the filter element interacts with the drain opening of the housing such that pressure builds up in a filter chamber of the housing;

wherein the central opening adapted to interact with the function carrier of the housing such that, in an installed position, the filter element separates a filter clean side from a filter crude side; and wherein the first recess and the at least one second recess are configured to facilitate positioning and aligning the filter element in the housing such that the locking pin of the filter element engages in the drain opening of the housing.

16. A filter system, comprising:

a housing including an opening, a function carrier, a drain opening, and at least one contour radially protruding from an outer surface of the housing;

a filter element including a first end disc, a second end disk, and a filter material disposed between the first end disk and the second end disk;

the first end disk including a radially projecting contour;

the second end disk including a central opening and an eccentrically projecting locking pin;

a cylindrical positioning body including a first recess disposed in an inner circumferential surface of the positioning body and a second recess disposed in an outer circumferential surface of the positioning body; and wherein the first recess and the second recess are configured to facilitate positioning and aligning the filter element in the housing such that (i) the locking pin of the filter element engages in the drain opening of the housing and (ii) the central opening interacts with the function carrier of the housing such that the filter element separates a filter clean side from a filter crude side.

17. The filter system according to claim 1, wherein the positioning mechanism includes a stop collar contacting the housing.

18. The filter system according to claim 1, wherein the filter element includes a centrally arranged support body that directly contacts the filter material.

19. The filter system according to claim 1, wherein:

the housing further includes a vent line arranged centrally in the function carrier; and the first end disc further includes an opening configured to cooperate with the vent line.

20. The filter system according to claim 1, wherein:

the housing is composed of aluminum; and the function carrier is composed of polyamide.

* * * * *